United States Patent [19]

Apczynski

[11] 4,009,911
[45] Mar. 1, 1977

[54] WHEEL TRIM AND METHOD
[75] Inventor: Frederick A. Apczynski, Livonia, Mich.
[73] Assignee: Norris Industries, Inc., Ypsilanti, Mich.
[22] Filed: Mar. 7, 1975
[21] Appl. No.: 556,466
[52] U.S. Cl. .......................... 301/37 SS; 29/159 A
[51] Int. Cl.² .......................................... B60B 7/00
[58] Field of Search ............... 29/159 A; 301/37 R, 301/37 P, 37 SS, 104, 78

[56] References Cited
UNITED STATES PATENTS

| 2,699,361 | 1/1955 | Jenkins | 301/37 SS |
| 2,709,113 | 5/1955 | Plotkin | 301/37 SS |
| 2,711,349 | 6/1955 | Groven | 301/37 SS |
| 2,928,694 | 3/1960 | Lyon | 301/37 SS |
| 3,843,201 | 10/1974 | Buerger | 301/37 SS |

Primary Examiner—Robert B. Reeves
Assistant Examiner—H. Grant Skaggs
Attorney, Agent, or Firm—Harness, Dickey & Pierce

[57] ABSTRACT

A simulated wire wheel cover and the method of assembling it. Three rows of spokes are assembled one on top of the other in overlapping relationship. Each of the three rows of spokes are comprised of a plurality of equal spoke sections, each having a plurality of spokes connected to a base member. The spoke sections of the bottom two rows of spokes are interchangeable with each other. The bottom two rows of spokes also are assembled in an annular outer cover element in a radially and circumferentially interlocking relationship. An inner circular cover element holds the bottom two rows of spokes in position. The spokes of the third or upper row of spokes are longer and lie in grooves in the inner cover element. The ends of the spokes in all three rows of spokes have simulated nuts thereon and rest in mating elements in the outer cover element. A hub element overlays the central portion of the inner cover element and holds the upper or third layer of spokes in place.

35 Claims, 8 Drawing Figures

WHEEL TRIM AND METHOD

SUMMARY — BACKGROUND OF THE INVENTION

The present invention relates generally to wheel covers for automobiles and other vehicles, and more particularly to improved simulated wire wheel covers and wheel trim.

There has been an increased demand in recent years for ornamental and sport wheel covers and wheel trim, particularly simulated wire wheel covers. Simulated wire wheel covers offer the aesthetic appeal of wire wheels commonly used on authentic sport vehicles. Actual wire wheels, that is wheels with a plurality of individual wire spokes interspaced between the rim and hub portions, are expensive and have many disadvantages. The wire wheels are heavy, susceptible to misalignment and unbalance (for example due to impact with road obstacles), and have a tendency to become loose and thus rattle and vibrate.

Some simulated wire wheel covers and trim are in existence. These devices, however, differ structurally and in method of assembly from the present invention. The spokes of known wheel covers typically demand individual assembly and placement which is costly and time consuming. Also the great number of individual parts in these wheel covers means that they are more susceptible to becoming loose and thus producing rattling and possibly vibrations.

The present invention overcomes the aforementioned disadvantages of known authentic and simulated wire wheels and provides unique, beneficial and advantageous simulated wire wheel covers and wire wheel trim.

In the wheel cover of the disclosed embodiment of the present invention, three separate and distinct layers or rows of spokes are provided. The bottom or lower two rows of spokes are shorter than the third or upper row of spokes and form a criss-cross pattern. Each row of these shorter rows of spokes consists of a plurality of spoke sections, each spoke section having a plurality of spokes attached to a base member. The spoke sections of the two bottom rows are interchangeable with each other and the spokes are set at an angle to the radius of the wheel. After the bottom row of spokes is assembled on the annular outer cover element of the wheel cover, the second row of spokes is placed on top of the first row, with the spoke sections being reversed so that a criss-cross pattern of spokes is produced. The outer ends of the spokes preferably have simulated nuts thereon and are positioned in pockets or apertures in the annular outer cover element. The inner ends of each section of the short spokes are radially and circumferentially positioned and interlocked on the outer cover element.

A circular inner cover element is positioned on the wheel cover overlapping the inner ends of the two rows of spokes to hold them in place. The circular inner cover element is screwed or otherwise secured to the outer cover element.

The third or longer row of spokes also consists of a plurality of spoke sections for a minimum of expense and for ease of manufacture and assembly. Each spoke section has a plurality of spokes attached to a base member. The outer ends of the spokes preferably have simulated nuts thereon and are set in pockets or apertures in the annular outer cover element. Near the inner end of the third row of spokes, the spokes are aligned in grooves in the inner cover element.

A hub element overlays the central portion of the inner cover element and is assembled on and secured to the inner cover element. The outer edge of the hub element overlaps the third row of spokes and holds it in place. An ornamental or decorative medallion can be added to the hub element.

An annular retainer flange is secured to the outer edge of the outer cover element. The annular flange is adapted to be detachably fastened to the rim of the vehicle wheel.

The problems associated with simulated wire wheel covers and wheel trim having one or more rows of spokes are minimized by the present invention. The number of unique structural features provided by it offer a beneficial improvement in wheel covers in terms of production, assembly, cost and aesthetics. Ease of production and assembly are improved by constructing the lower rows of spokes from a plurality of equal spoke sections, each spoke section having a plurality of spokes and a base member on it. Production and assembly are also improved by constructing the two lower rows of spokes from identical and interchangeable spoke sections, the sections merely being flipped over one on top of the other to provide a criss-cross pattern of spokes. The third layer of spokes is also comprised of a plurality of equal spoke sections, each section having a certain number of spokes on it connected to a base member. Inventory of differently shaped parts is reduced.

Rattling of the wheeel cover is minimized by the present invention. The various elements of the wheel cover are secured in position such that they provide a tensioning or clamping effect on each of the rows of spokes. The bottom two layers of spokes are also radially and circumferentially interlocked in order to prevent possible movement and rattling.

Other objects, features, and advantages of the present invention will be apparent from the following specification, claims and drawings.

BRIEF DESCRIPTION OF THE DRAWINGS

The invention will be more easily understood by reference to the accompanying drawings in which:

FIG. 8 is a cross-sectional view taken along the line 8—8 of FIG. 1.

DESCRIPTION OF THE PREFERRED EMBODIMENT

Figures 1, 5, 6, 7:
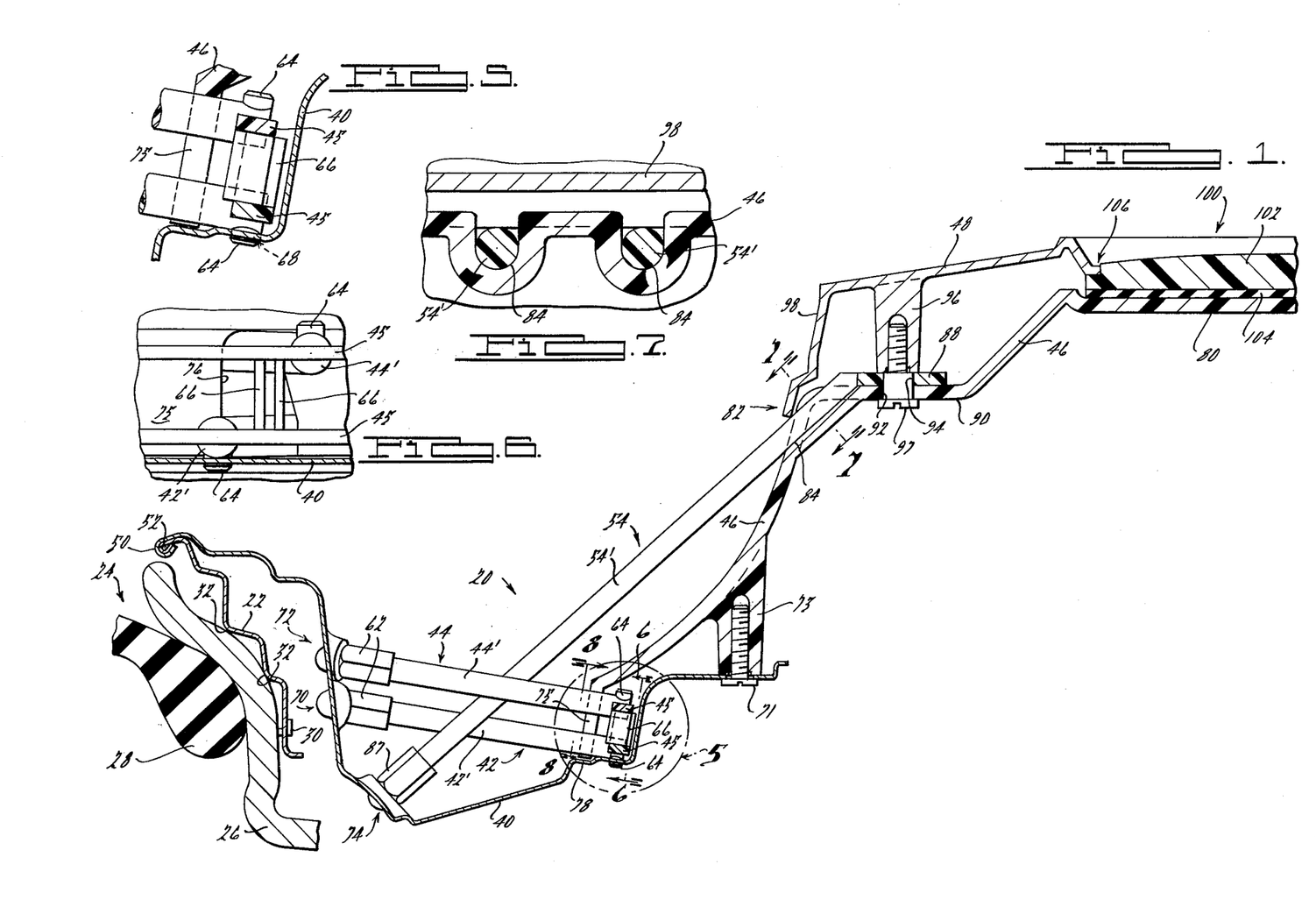
FIG. 1 is a side sectional view of a simulated wire wheel cover in accordance with the present invention.
FIG. 5 is an enlarged view of the portion indicated by a circle of FIG. 1.
FIG. 6 is a cross-sectional view taken along the line 6—6 of FIG. 1.
FIG. 7 is a cross-sectional view taken along the line 7—7 of FIG. 1.
Figures 2, 3:
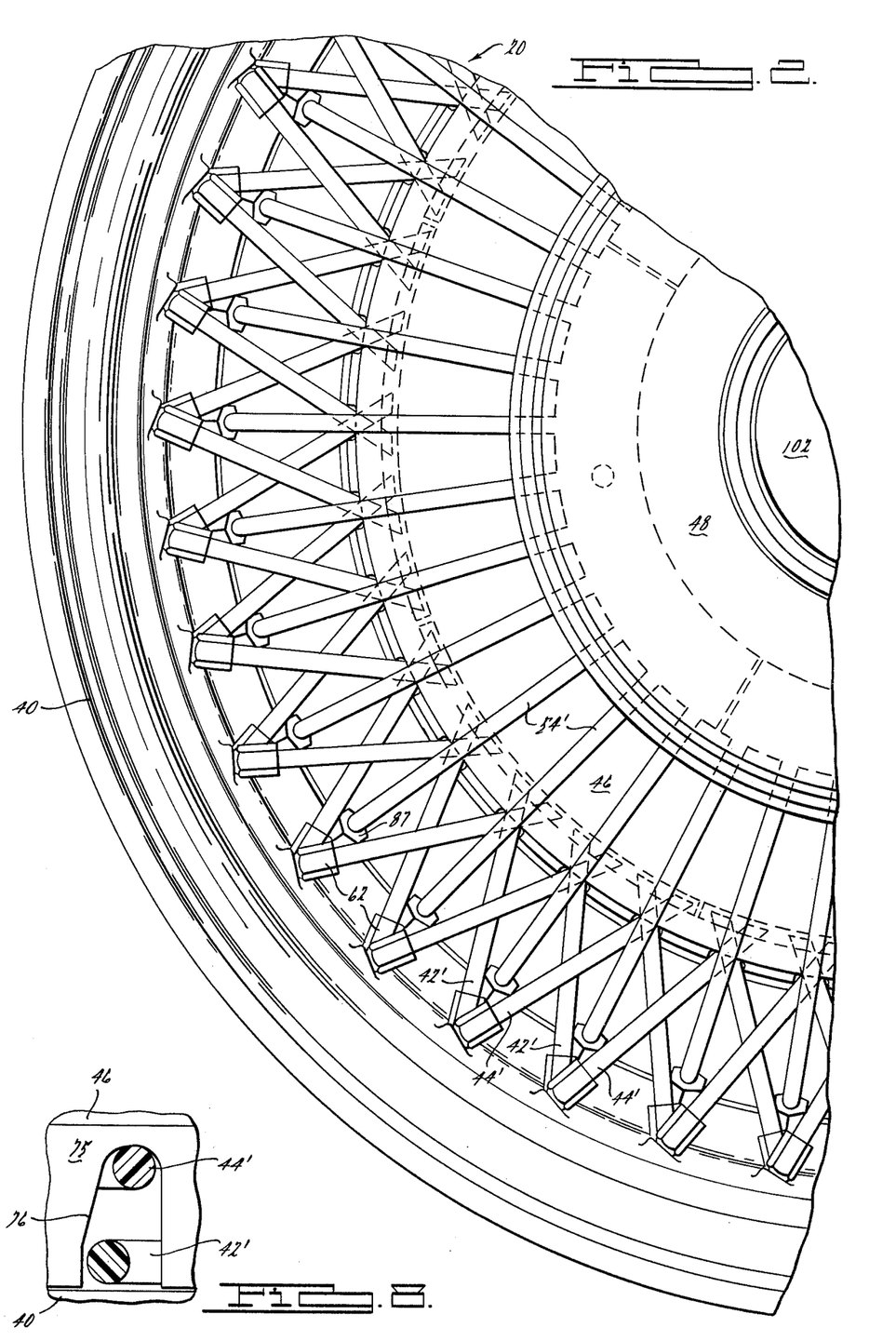
FIG. 2 is a partial plan view of a simulated wire wheel cover in accordance with the present invention.
FIG. 3 illustrates a spoke section for one of the two bottom rows of spokes.
Figure 3:
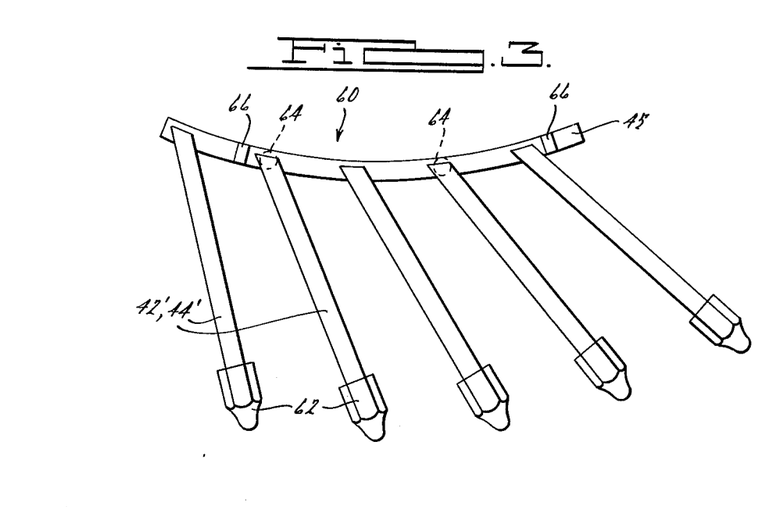

As shown in FIGS. 1 and 2, an improved aesthetic simulated wire wheel cover (or wheel trim) 20 is provided. In accordance with an exemplary constructed embodiment of the present invention, the simulated wire wheel cover 20 has an annular retainer flange 22 for mating with the wheel 24 of the automobile or other vehicle. The wheel 24 can be of any conventional type and includes a rim member 26 which supports a tire 28. Only a portion of the wheel, rim, and tire are shown in the drawings.

The annular retainer flange 22 is adapted to be detachably secured to the wheel 24 by any conventional means, such as a plurality of resilient retaining teeth 30 constructed in accordance with U.S. Pat. No. 3,037,816. The teeth 30 are engageable with the axially extending rim 26 of the wheel 24.

Preferably the retainer flange 22 is provided with one or more annular reinforcing and locating shoulders 32 engageable with the wheel 24 to locate the wheel cover with respect to the wheel in the usual manner. The wheel cover 20, by means of the retainer flange 22 connected thereto, is mounted on the outer face of the wheel 24 in overlying relationship thereto. The wheel cover 20 is approximately the same diameter as the greatest diameter of the rim 26 of wheel 24 and thus substantially completely covers the wheel and conceals it.

The simulated wire wheel cover 20 has an annular outer cover element 40 which supports the two lower layers or rows of spokes 42 and 44, a circular inner cover element 46 and a circular central hub element 48. The outer cover element 40 is secured to the retainer flange 22 as by roll crimping or clamping the outer edge portion 50 of the element 40 to the axially extending outer edge portion 52 of the retainer flange 22. In that manner, the outer cover element 40 and the retainer flange 22 are rigidly and permanently secured and locked together.

The retainer flange 22 is preferably made of rolled sheet metal, such as galvanized steel or the like. The outer cover element 40 is also made of stamped sheet metal and preferably is made of stainless steel or the like. The outer cover element 40 may be decorated in the colors of the body of the vehicle with which it is to be associated and can contain various portions of that color in combination with portions which are natural metal or chrome plated.

There are three layers or rows of spokes in the embodiments of the present invention disclosed herein. The two lower or bottom rows of spokes (as shown in FIG. 1) are indicated generally by the numerals 42 and 44. The third or upper row of spokes is indicated generally by the numeral 54. Preferably, the spokes of the two lower rows 42 and 44 are of exactly the same size, shape, and length and in the disclosed embodiment are shorter than the spokes contained in row 54. It is understood that the present inventive wheel cover or trim may contain only one or more rows of spokes.

The rows of spokes 42 and 44 are placed in the outer cover element 40 and overlay one another. The spokes in rows 42 and 44 are set at an angle to the center axis of the wheel cover or trim 20, so that when the two rows are assembled in the outer cover element, the spokes form a crossing or criss-cross pattern (as shown in FIG. 2). The row of spokes 54 has its radially inner end set above the rows of spokes 42 and 44 and its radially outer end set in the outer cover element 40 below the rows of spokes 42 and 44 (as shown in FIGS. 1 and 2).

The plurality of individual spoke members contained in the row of spokes 42 are indicated by numeral 42'; the individual spoke members contained in the row of spokes 44 are indicated by numeral 44'; and the individual spoke members contained in the row of spokes 54 are indicated by numeral 54'.

In the disclosed embodiment, there are forty spokes in rows 42 and 44 arranged circumferentially around the wheel cover 20. These are arranged in eight separate spoke sections, each of the spoke sections comprising five individual spokes 42', 44' connected to an arc-shaped base member 45. The base member 45 of each spoke section 60 comprises approximately one-eighth of the circumference of a circle. Thus when eight of the spoke sections 60 are arranged in a row in the outer cover element 40, a complete annular layer of spokes is provided.

A spoke section 60 is shown in FIG. 3. The spoke sections for rows 42 and 44 preferably are exactly the same and interchangeable with one another. The spokes 42', 44' of the spoke sections 60 are set at an angle to the radius (and center axis) of the wheel cover and thus at an angle to the base member 45. The base member 45 preferably is rectangular in cross-section and slightly flexible for ease of assembly.

A simulated nut 62 is contained on the end of each of the spoke members 42', 44'. The nuts 62 preferably are formed with the spokes 42', 44' as integral units when the sections 60 are formed. This minimizes the tendency of the parts to become loose and cause rattling. The nuts 62 make the spokes simulate more precisely the appearance of authentic wire wheels.

The spoke sections 60 are formed as one piece and preferably are made of a plastic material, such as acrylonitrile-butadiene-styrene (ABS), high impact polystyrene, or the like. ABS is currently in common use for automobile accessories because it is easily molded, relatively inexpensive, and has good impact strength. The spoke sections 60 preferably are injection molded and can be the same color of the vehicle with which the simulated wire wheel covers 20 are to be used. If so colored, the plastic material forming the spoke sections 60 is preferably pigmented with the desired color to about 80% and the finished sections 60 are also painted with that same color. The spoke sections 60 are pigmented so that if they become chipped or cracked or the outer paint layer is scraped away, a change in color will not be discerned or noted.

Each of the spoke sections 60 has at least one and preferably two projections or orienting nubs 64 positioned on one side of the base member 45. Each spoke section 60 also has at least one and preferably two generally rectangular spacer members 66 positioned on the opposite side of the base member 45 from the nubs 64. The nubs 64 and spacer members 66 are formed on the spoke sections 60 when they are molded.

A plurality of apertures or holes 68 (FIG. 5) are provided in the outer cover element 40 for mating with the nubs 64 of the spoke sections 60. In the preferred embodiment, wherein eight spoke sections 60 are provided in each of the rows of spokes 42 and 44, and each spoke section 60 has two nubs 64 thereon, there will be 16 equally spaced apertures 68 arranged circumferentially on the outer cover element 40. The seating of the nubs 64 in the apertures 68 fixes and maintains at least the bottom row of spokes 42 in a predetermined radial and circumferential position.

Also in the outer cover element 40, three series or rows of equally spaced mating elements (pockets, holes, indentations or the like) 70, 72 and 74 are provided. The mating elements 70, 72 and 74 comprise generally raised annular portions with an aperture, pocket or indentation in the center. In the illustrated embodiment there are 40 mating elements in each series around the circumference of the outer cover element 40. The row of mating elements 70 are provided to mate with the ends of the spokes 42', the mating elements 72 are provided to mate with the ends of the spokes 44', and the mating elements 74 are provided to mate with the ends of the spokes 54'.

When rows of spokes 42 and 44 are assembled, the ends of the individual spokes 42' and 44' having the simulated nuts 62 thereon are inserted in their respective mating elements 70 or 72. When the lower row of spokes 42 is assembled and the ends of the nuts 62 are inserted in the corresponding mating element 70, the radially inner ends of each spoke section 60 forming row 42 are situated such that the nubs 64 associated therewith are seated in the corresponding apertures 68.

When the spoke sections 60 are assembled to form the bottom row of spokes 42, the individual spokes 42' will be positioned at an angle from the radius and center axis of the wheel cover or trim 20. When the second row of spokes 44 is assembled, the spoke sections 60 are flipped or turned over so that the individual spokes are set an angle opposite to that of the spokes in the bottom row. In this manner, an "x-shaped" or criss-cross pattern of spokes is formed. For the second row of spokes 44, the ends of the simulated nuts 62 are placed in the corresponding mating elements 72 and the spoke sections 60 are positioned on top of the bottom row of spokes 42. The spacing elements 66 on each of the spoke sections 60 position and space the radially inner ends of the two rows of spokes 42 and 44 from each other, as shown in FIGS. 1, 5 and 6.

As depicted in FIG. 1, the axially extending outer wall of the outer cover element 40 is angled slightly radially outwardly. Thus the ends of the spokes 44' are positioned slightly radially outwardly of the ends of the spokes 42'. The radially inner ends of the spokes 42' and 44' and thus of the spoke sections 60 forming the rows of spokes 42 and 44 are correspondingly slightly offset from each other. The spacing members 66 are provided with sufficient width in the radial direction to compensate for this radial displacement. This is shown in detail in FIG. 5.

After the rows of spokes 42 and 44 are assembled in the outer cover element 40, the inner cover element 46 is set in place. When the element 46 is finally secured in place, which can be after the rows 42 and 44 are initially set in position or later after the entire wheel cover 20 is assembled, it rigidly and firmly holds the rows of spokes 42 and 44 in position (as described below).

The inner cover element 46 is adapted to be secured to the outer cover element 40 by means of a plurality of screws 71, although it is understood that any conventional means can be utilized. For this purpose, a plurality of support members 73 are provided on the inner cover element 46. The screws 71 preferably are self-tapping screws. The inner cover element 46 is preferably made of molded plastic which is less expensive, easier to produce, and less weight than sheet metal commonly used on wheel covers (it is preferable from a riding and handling point to reduce the amount of unsprung weight of the vehicle). Also, the inner cover element 46 may be either pigmented or painted with the color of the vehicle that the wheel cover 20 is to be associated with.

Along the axially extending outer flange 75 of the inner cover element 46, a plurality of arch-type openings 76 are provided (see FIG. 8). The openings 76 are equal in number to the number of individual spokes 42', 44' located in the two bottom rows of spokes. In the preferred embodiment, this means that the inner cover element 46 has forty arch-type openings 76.

The openings 76 are non-uniform in shape, as shown in FIG. 8. This is due to the fact that the outer flange 75 of the inner cover 46 does not intersect or meet the spokes 42' and 44' at their precise point of crossing or intersection (see FIG. 2). Instead, at the point that the flange 75 fits over the spokes 42' and 44', the spokes 42' and 44' are slightly offset from each other.

In order to hold the rows of spokes 42 and 44 firmly in place, the arch-type openings 76 are designed so that the top of the openings 76 will come in contact with the spokes 44' and exert a tension force thereon when the screw means 71 are tightened. The force or pressure on the upper row of spokes 44 in turn (by means of the spaced members 66) causes the bottom row of spokes 42 to be firmly set in place.

At the point where the terminal end of the axial extending flange 75 should or will come in contact with the outer cover element 40, a circumferential depression or recess 78 is provided (see FIG. 1). The recess 78 provides a clearance space so that the inner cover element 46 can be clamped tightly and firmly in place and the top of the arch-type openings 76 will come in contact with the upper row of spokes 44 and thus secure rows of spokes 42 and 44 tightly and firmly in place.

The inner cover element 46 is shaped somewhat like an inverted bowl. The central area of the inner cover element 46 is raised and in axle alignment with the axle of the wheel 24. In that central area, the inner cover element 46 has a slightly depressed area 80 which is substantially circular in shape and adapted to contain a portion of the hub element 48 as described in more detail below.

At a point between the depressed area 80 and the axially extending flange 75, a corner area 82 is provided on the inner cover element 46. A plurality of indentations or grooves 84 are provided on the cover element 46 in that corner area 82. The grooves 84 are equally spaced around the circumference of the wheel cover and correspond in number to the number of spokes 54' in the uppermost row of spokes 54. In the preferred embodiment, 40 grooves 84 are provided. A cross-section of the corner area 82 showing the individual spokes 54' resting in the grooves 84 is shown in FIG. 7.

Figure 4:
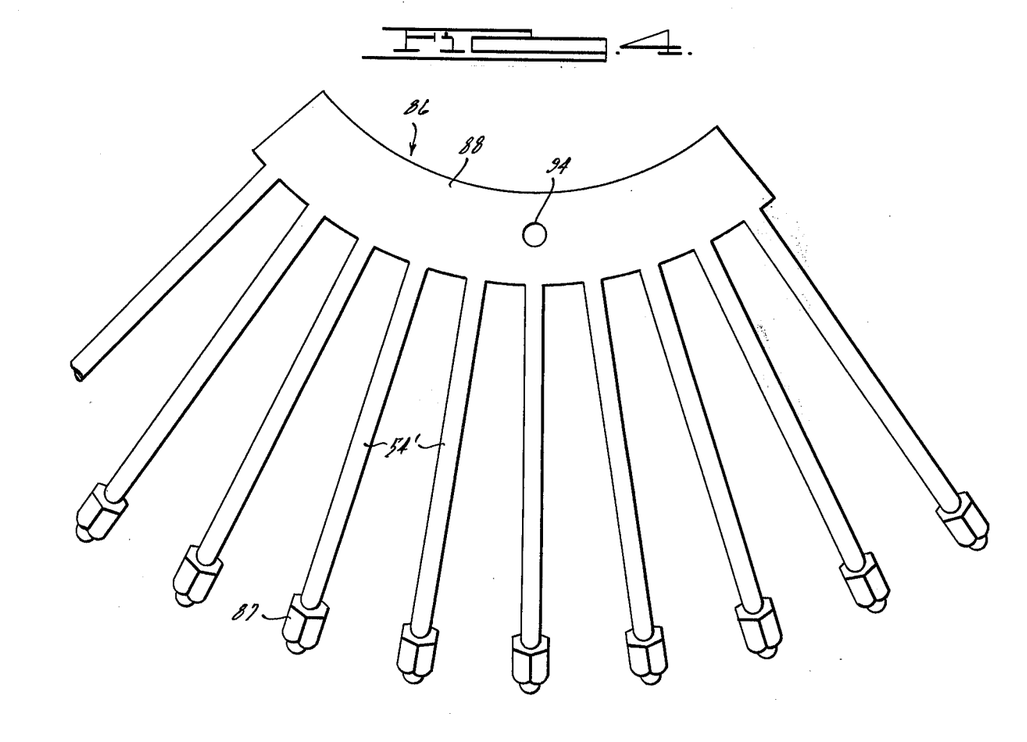
FIG. 4 illustrates a spoke section for the upper row of spokes.

In the same manner and for the same reasons that the row of spokes 42 and 44 are comprised of a number of equally sized and shaped spoke sections 60, the row of spokes 54 is similarly comprised of a number of equally sized and shaped sections 86 (see FIG. 4). Preferably, the row of spokes 54 is comprised of approximately four spoke sections 86. Each of the spoke sections 86 has 10 spokes 54' connected to an arc-shaped base member 88. Each base member 88 comprises approximately one-fourth of the circumference of a circle. A simulated nut 87, similar to the simulated nuts 62 described above in reference to the spoke sections 60, is provided on the end of each spoke 54'.

The base members 88 of the spoke sections 86 are bent at an angle from the plane of the spokes 54' (see FIG. 1). The inner cover element 46 contains an annular relatively flat surface 90 on which the base members 88 are situated when the wheel cover 20 is assembled. Thus, after the outer cover element 40 is secured to the retainer flange 22, the two rows of spokes 42 and 44 are assembled in place and the inner cover element 46 has been put in position (and either loosely or tightly secured in place), the spoke sections 86 are put into place around the circumference of the wheel cover with the spokes 54' positioned in the grooves 84 in the inner cover element 46 and the base members 88 set in position on the surface 90. The radially outer ends of the spokes 54' are seated in the mating members 74 in the outer cover element 40 as described above. Subsequently, the hub element 48 is placed in position over the central region of the inner cover element 46.

A plurality of holes 92 are provided in the surface area 90. Corresponding holes 94 are provided in the base members 88 of the spoke sections 86. When the spoke sections 86 are assembled on the wheel cover 20, the holes 92 and 94 are in alignment. A plurality of screws 97 or other similar means are inserted through the aligned holes 92 and 94 and secured to the hub element 48. For this purpose, a plurality of support members 96 are provided on the hub element 48. In this manner, the hub element 48 is secured rigidly and firmly to the inner cover element 46.

Hub element 48 has an axially extending outer flange element 98 on its outer circumference. Flange element 98 is adapted to come in contact with the spokes 54' forming the upper row of spokes 54. When the plurality of screws 97 are tightened, the terminal end of the flange 98 is forced down firmly on the individual spokes 54' so that they are held firmly and tightly in place. In this manner, the spokes 54' will not come loose and rattle or vibrate.

The hub element 48 is preferably a zinc die casting, but can be of any other conventional material. The hub element 48 can be circular, or it can be annular in shape with an open space 100 in its center. Preferably, a medallion or other decorative means 102 and a backing pad 104 are provided with the hub element 48 and are either attached thereto or adapted to fit in the circular space 100 and thus in the depression 80 in the inner cover element 46. The medallion 102 is preferably made of plastic and may be either provided in the same color as the body of the vehicle or in some matching or complementary color. The pas 104 is preferably of rubber and is provided to cushion the medallion 102 and prevent it from rattling or becoming loose. The medallion 102 and pad 104 are held firmly in place when the hub element 48 is secured to the inner cover element 46. It is also possible to have the medallion 102 be secured to the hub element 48 at their mutually circular line of contact 106. The medallion 102 and hub element 48 can be secured together by any conventional means.

Although the present embodiment of the invention has been described as having eight equal spoke sections 60 forming the rows of spokes 42 and 44 and four equal spoke sections 86 forming the row of spokes 54, it is understood that a greater or lesser number of spoke sections or each of the rows, or a different number of rows, can be provided. The larger the spoke sections, however, that is, the greater the circumferential area that the spoke sections cover and the greater the number of individual spokes that they contain, the more difficult it is to align the spoke sections on the wheel cover. On the other hand, if the spoke sections are smaller, it is easier to align them on the wheel cover, but this means that increased time, effort and expense are necessary in order to manufacture the resultant greater number of spoke sections and to assemble them on the wheel cover. It is also understood that various numbers of individual spokes can be provided in each row of spokes on the wheel cover 20, the number described herein having been found to provide an aesthetic and ornamental design and ease of production and assembly.

In the present invention, a minimum strain on all of the individual spokes is provided. Therefore, axial fracture and loss of finish in assembly and use are minimized. The rows of spokes are easy to assemble since they are comprised of a limited number of equal segments each having a plurality of individual spokes. Individual assembly and tensioning of the spokes is unnecessary. The parts or elements of the inventive wheel cover are designed so that they interact and interlock with one another and mutually hold and secure each other in place.

The use of common parts (spoke sections 60) for the two lower rows of spokes 42 and 44 also is significant. Production, inventory and assembly time and expense are reduced. Also, great flexibility in the design of the wheel cover and the use of the wheel cover for ornamental purposes is achieved.

Although the invention has been described with respect to certain embodiments, it is understood that numerous modifications and changes may occur to those skilled in the art and that any such modifications and changes are included within the scope of the invention as defined by the following claims.

I claim:
1. A wheel structure comprising a vehicle wheel having an outer face and a simulated wire wheel cover detachably secured to the outer face of the vehicle wheel, the simulated wheel cove comprising,
   a retainer flange adapted to be detachably secured to the vehicle wheel,
   an outer cover element connected to said retainer flange,
   an inner cover element connected to said outer cover element,
   a hub element connected to said inner cover element,
   a first plurality of spoke sections positioned circumferentially in said outer cover element forming a first row of spokes, each of the spoke sections comprising at least three spoke memebers connected at their inner ends to an arcuately shaped base member,
   a second plurality of spoke sections positioned circumferentially in said outer cover element forming a second row of spokes, said second row of spokes overlying said first row of spokes, each of the second plurality of spoke sections comprising at least three spoke members connected at their inner ends to an arcuately shaped base member, and
   a third plurality of spoke sections positioned circumferentially on the wheel cover forming a third row of spokes, each of the spoke sections comprising at least three spoke members connected at their inner ends to an arcuately shaped base member, the radially inner ends of said spoke sections positioned on said inner cover element, the radially outer ends of said spoke members positioned in said outer cover element.

2. A wheel cover described in claim 1 wherein each of said first and second plurality of spoke sections are structurally substantially the same and interchangeable with one another.

3. The wheel cover described in claim 1 wherein said spoke members of said first and second plurality of spoke sections form a criss-cross pattern.

4. The wheel cover described in claim 1 further comprising means integral with said base members on said first and second plurality of spoke sections for spacing said first plurality of spoke sections and said second plurality of spoke sections from each other at their radially inner ends.

5. The wheel cover described in claim 1 further comprising means for radially and circumferentially positioning said first plurality of spoke sections on said wheel cover.

6. The wheel cover described in claim 1 wherein said inner cover element is adapted to secure said first and second plurality of spoke sections rigidly and firmly in position.

7. The wheel cover described in claim 1 wherein said hub element is adapted to secure said third plurality of spoke sections rigidly and firmly in position.

8. The wheel cover described in claim 1 further comprising decorative means attached to said hub element.

9. The wheel cover described in claim 1 further comprising simulated nuts positioned on the radially outer ends of each of the spoke members of said first, second and third spoke sections.

10. The wheel cover described in claim 9 wherein said first, second and third spoke sections are made of a plastic material and said simulated nuts are molded on said spoke sections.

11. The wheel cover described in claim 1 wherein the radially outer ends of each of the spoke members of said first, second and third spoke sections are positioned in corresponding mating members in said outer cover element.

12. The wheel cover described in claim 1 further comprising a plurality of circumferentially spaced grooves in said inner cover element, the number of said grooves corresponding to the total number of spoke members in said third row of spokes.

13. The wheel cover described in claim 1 wherein eight of said spoke sections are provided for each of said first and second rows of spokes, each of said spoke sections having five spoke members connected to a base member.

14. The wheel cover described in claim 13 further comprising at least one spacer member connected to each of said base members, said spacer members separating the inner ends of the first and second rows of spokes from each other.

15. The wheel cover described in claim 13 further comprising at least one nub positioned on each of said base members, said nubs adapted to radially and circumferentially position said spoke sections on said wheel cover.

16. The wheel cover described in claim 1 wherein four of said third spoke sections are provided, each of said spoke sections having ten spoke members connected to a base member.

17. The wheel cover described in claim 1 wherein the plane formed by said third plurality of spoke sections intersects the planes formed by the first and second plurality of spoke sections whereby the radially outer ends of the spoke members in said third plurality of spoke sections are positioned on said outer cover element below said first and second plurality of spoke sections.

18. A wheel structure comprising a vehicle wheel having an outer face and a simulated wire wheel cover detachably secured to said outer face, said wheel cover having a plurality of rows of spokes positioned thereon with each of said rows of spokes having a plurality of spoke members, the improvement comprising a plurality of spoke sections forming each of the rows of spokes, each of said spoke sections comprising at least three spoke members connected at one end of a base member, the spoke sections for at least two of said rows of spokes being structurally substantially the same, interchangeable with each other, and positioned such that the side of the spoke sections of one of said rows which is oriented axially inwardly is oriented axially outwardly in the other of said rows.

19. The wheel cover described in claim 18 further comprising means for radially and circumferentially positioning each of said spoke sections.

20. The wheel cover described in claim 18 wherein the plane formed by one of said rows of spokes intersects the plane formed by another of said rows of spokes.

21. The wheel cover described in claim 18 further comprising means integral with the base member on each of said two rows of spokes for spacing said two rows of spokes from each other at their radially inner ends.

22. The wheel cover described in claim 18 wherein said spokes in each of said rows are oriented at an oblique angle to the radius of the wheel cover.

23. A method of assembling a simulated wire wheel cover, comprising,
rigidly fastening a retainer flange to an outer cover element,
positioning a first row of spokes in said outer element, said row of spokes comprising a plurality of spoke sections, each of said spoke sections having at least three spoke members connected to an arcuately shaped base member,
positioning a second row of spokes in said outer cover element overlying said first row of spokes, said second row of spokes comprising a plurality of spoke sections, each of said spoke sections having at least three spoke members connected to an arcuately shaped base member,
fastening an inner cover element to said outer cover element,
positioning a third row of spokes, the radially outer ends of the spokes being positioned in said outer cover element below said first and second row of spokes and the radially inner ends of the spokes being positioned on the inner covered element, said third row of spokes comprising a plurality of spoke sections, each of said spoke sections having at least three spoke members connected to an arcuately shaped base member, and
fastening a hub element to said inner cover element.

24. The method described in claim 23 wherein the radially outer ends of the spoke members have simulated nuts positioned thereon and the nuts are seated in mating elements on said outer cover element.

25. The method described in claim 23 wherein said first and second rows of spokes are positioned such that the spoke members thereof form a criss-cross pattern.

26. The method described in claim 23 wherein said inner cover element is adapted to rigidly and firmly secure said first and second rows of spokes in position.

27. The method described in claim 23 wherein said hub element is adapted to rigidly and firmly secure said third row of spokes in position.

28. The method described in claim 23 wherein eight of said spoke sections are provided for each of said first and second rows of spokes and each of said spoke sections has five spoke members.

29. The method described in claim 23 wherein four of said spoke sections are provided for said third row of spokes and each spoke section has ten spoke members.

30. The method described in claim 23 further comprising the steps of assembling decorative means on said hub element.

31. The method described in claim 23 wherein at least each of said spoke sections in each of said first and second rows of spokes has means for being radially and circumferentially positioned on said wheel cover.

32. The method described in claim 23 wherein each of said spoke sections in said first and second rows of spokes are substantially the same, interchangeable with one another, and positioned in said outer cover such that the side of the spoke sections of one of said first and second rows which is oriented axially outwardly is oriented axially inwardly in the other of said rows.

33. A wheel structure comprising a vehicle wheel having an outer face and a simulated wire wheel cover detachably secured to said outer face, said wheel cover having a plurality of rows of spokes positioned thereon with each of said rows of spokes having a plurality of spoke members, the improvment comprising a plurality of spoke sections forming each of the rows of spokes, each of said spoke sections comprising a plurality of spoke members connected at one end to an arcuately shaped base member, and means integral with at least one of said base members for spacing two of said rows of spokes from each other at their radially inner ends.

34. The wheel structure described in claim 33 wherein the spoke sections for at least two of said rows of spokes are substantially the same, interchangeable with one another, and positioned such that the side of the spoke sections of one of said rows which is oriented axially outwardly is oriented axially inwardly in the other of said rows.

35. The wheel structure described in claim 34 wherein said spokes in each of said rows of spokes are oriented at an oblique angle to the radius of the wheel cover.

* * * * *

UNITED STATES PATENT OFFICE
CERTIFICATE OF CORRECTION

Patent No. 4,009,911                    Dated  March 1, 1977

Inventor(s) Frederick A. Apczynski

It is certified that error appears in the above-identified patent and that said Letters Patent are hereby corrected as shown below:

Column 2, line 32:    "wheeel" should be --wheel--

Column 5, line 15:    "element" should be --elements--

Column 6, line 21:    "spaced" should be --spacer--

Column 7, line 47:    "pas" should be --pad--

Column 7, line 62:    "or" (first occurrence) should be --for--

Column 8, line 38:    "cove" should be --cover--

Column 8, line 49:    "memebers" should be --members--

UNITED STATES PATENT OFFICE
CERTIFICATE OF CORRECTION

Patent No. 4,009,911  Dated  March 1, 1977

Inventor(s) Frederick A. Apczynski

It is certified that error appears in the above-identified patent and that said Letters Patent are hereby corrected as shown below:

Column 9, line 34
(Claim 10, line 4):  after "spoke" insert --members and comprise integral parts of said spoke--

Column 10, line 12
(Claim 18, line 9):  "of" should be --to--

Column 10, line 32
(Claim 22, line 2):  after "rows" insert --of spokes--

Column 10, line 38
(Claim 23, line 5):  after "outer" insert --cover--

Column 12, line 8
(Claim 33, line 6):  "improvment" should be --improvement--

Signed and Sealed this

Seventeenth Day of May 1977

[SEAL]

Attest:

RUTH C. MASON
Attesting Officer

C. MARSHALL DANN
Commissioner of Patents and Trademarks